US008310698B2

(12) United States Patent
Ogasawara et al.

(10) Patent No.: US 8,310,698 B2
(45) Date of Patent: Nov. 13, 2012

(54) IMAGE FORMING APPARATUS AND ACTIVATING METHOD THEREOF

(75) Inventors: Naruhiko Ogasawara, Chiba (JP); Nobuhiro Shindo, Tokyo (JP); Takeshi Fujita, Tokyo (JP); Kazuma Saitoh, Tokyo (JP); Daisuke Okada, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 957 days.

(21) Appl. No.: 12/033,283

(22) Filed: Feb. 19, 2008

(65) Prior Publication Data

US 2008/0198411 A1    Aug. 21, 2008

(30) Foreign Application Priority Data

Feb. 19, 2007 (JP) ................................. 2007-038117

(51) Int. Cl.
*G06F 3/12* (2006.01)

(52) U.S. Cl. ...... 358/1.15; 358/1.6; 358/1.13; 358/1.14; 358/1.16; 713/176; 711/100; 711/102; 711/104; 711/105; 711/108

(58) Field of Classification Search ........................ None
See application file for complete search history.

(56) References Cited

U.S. PATENT DOCUMENTS

| | | | | |
|---|---|---|---|---|
| 7,443,527 B1* | 10/2008 | Shigeeda | ..................... | 358/1.15 |
| 2003/0234950 A1* | 12/2003 | Lay | ............................. | 358/1.14 |
| 2005/0200889 A1* | 9/2005 | Oomura | ....................... | 358/1.15 |
| 2005/0254089 A1* | 11/2005 | Oliver et al. | ................ | 358/1.16 |
| 2006/0017962 A1* | 1/2006 | Burdette et al. | ............ | 358/1.15 |
| 2006/0262356 A1* | 11/2006 | Honda et al. | .................. | 358/400 |
| 2006/0290726 A1* | 12/2006 | Takahashi | ...................... | 347/14 |
| 2007/0086052 A1* | 4/2007 | Furuya | ......................... | 358/1.15 |
| 2008/0117447 A1* | 5/2008 | Okada et al. | ................ | 358/1.13 |

FOREIGN PATENT DOCUMENTS

| | | |
|---|---|---|
| JP | 2000-358207 | 12/2000 |
| JP | 2005-40974 | 2/2005 |
| JP | 2006-27140 | 2/2006 |
| JP | 2006-172324 | 6/2006 |
| JP | 2007-7873 | 1/2007 |

OTHER PUBLICATIONS

Office Action issued Jun. 27, 2011, in Japan Patent Application No. 2007-038117.

* cited by examiner

*Primary Examiner* — Marivelisse Santiago Cordero
*Assistant Examiner* — Miya J Cato
(74) *Attorney, Agent, or Firm* — Oblon, Spivak, McClelland, Maier & Neustadt, L.L.P.

(57) ABSTRACT

An image forming apparatus includes a memory interface configured to receive an external memory, an internal memory, a reading unit, a writing unit, and an activating unit. The activating unit activates the image forming apparatus when an external memory is connected to the memory interface and model data read from the external memory by the reading unit is the same as model data about the image forming apparatus stored in the internal memory.

9 Claims, 9 Drawing Sheets

IMAGE FORMING APPARATUS AND ACTIVATING METHOD THEREOF

CROSS-REFERENCE TO RELATED APPLICATIONS

The present application claims priority to and incorporates by reference the entire contents of Japanese priority document 2007-038117 filed in Japan on Feb. 19, 2007.

BACKGROUND OF THE INVENTION

1. Field of the Invention

The present invention relates to an image forming apparatus and an activating method thereof.

2. Description of the Related Art

When an image forming apparatus cannot be used due to some reason such as a failure, another image forming apparatus of the same model type is often used as an alternative to the image forming apparatus. In such a case, setting data about an originally-used image forming apparatus is installed in an alternative image forming apparatus. For example, an external memory that stores therein various setting data and control software of the originally-used image forming apparatus is removed from the originally-used image forming apparatus, and is connected to the alternative image forming apparatus. In this manner, the alternative image forming apparatus can operate in the same operation environment as that of the originally-used image forming apparatus.

Japanese Patent Application Laid-open No. 2006-172324 discloses a conventional technology for performing the above operation by using a management system. The management system can change a combination of an image forming apparatus and a corresponding memory medium (memory card) to be connected to the image forming apparatus, although such a combination usually cannot be changed. An image forming apparatus is connected to a remotely located management center via a communication network. A combination of the image forming apparatus and a corresponding memory card available to the image forming apparatus is registered in the management center. When it is determined that a memory card, other than the corresponding memory card, is connected to the image forming apparatus, the image forming apparatus inquires of the management center whether the connected memory card can be used in the image forming apparatus. When the management center gives permission to the image forming apparatus, the image forming apparatus use the connected memory card. In this manner, although an illegally copied memory card cannot be used in an image forming apparatus, a memory card of an image forming apparatus can be used in an alternative image forming apparatus when the image forming apparatus malfunctions.

As described above, the alternative image forming apparatus has the same setting data as that of the originally-used image forming apparatus. After repaired, the originally-used image forming apparatus is connected to the network again. When the alternative image forming apparatus is accidentally connected to the network, these two image forming apparatuses having the same address are connected to the same network. Therefore, both the originally-used image forming apparatus and the alternative image forming apparatus cannot operate properly.

SUMMARY OF THE INVENTION

It is an object of the present invention to at least partially solve the problems in the conventional technology.

According to an aspect of the present invention, there is provided an image forming apparatus. The image forming apparatus includes a memory interface configured to receive an external memory that stores therein data including model data; an internal memory that stores therein data about the image forming apparatus including internal model data and setting data; a reading unit configured to read data from an external memory connected to the memory interface; a writing unit configured to write the data about the image forming apparatus from the internal memory to an external memory connected to the memory interface; and an activating unit that activates the image forming apparatus when an external memory is connected to the memory interface and model data read by the reading unit from connected external memory matches the internal model data.

According to another aspect of the present invention, there is provided a method of activating an image forming apparatus. The method includes determining that model data stored in an external memory matches internal model data about the image forming apparatus stored in an internal memory upon detecting that the external memory is connected to a memory interface, the external memory storing therein data including the model data and setting data; reading the data from the external memory; writing the data read at the reading to the internal memory; and activating the image forming apparatus.

According to still another aspect of the present invention, there is provided a method of activating an image forming apparatus. The method includes detecting that an external memory is connected to a memory interface, the external memory storing therein data including model data and setting data; reading the data from the external memory; determining whether the model data read from the external memory at the reading matches internal model data about the image forming apparatus stored in an internal memory; activating the image forming apparatus when the model data read at the reading matches the internal model data; and writing the data read at the reading to the internal memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

According to an embodiment of the present invention, an image forming apparatus is activated when a memory card is connected thereto that stores therein data on an image forming apparatus of a model type the same as that of the image forming apparatus.

Figure 6:
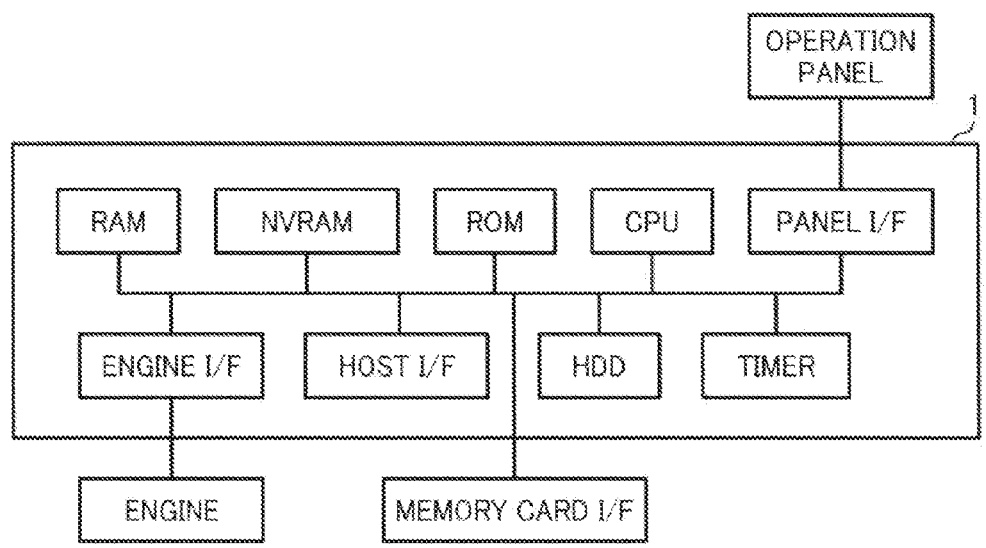
FIG. 6 is a hardware block diagram of an image forming apparatus according to the embodiment.
Figure 7:
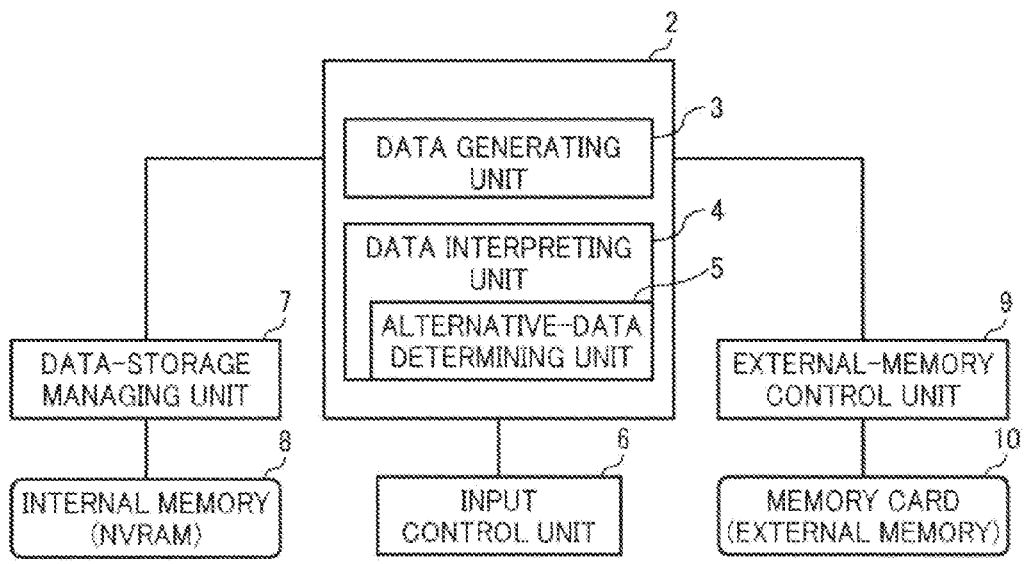
FIG. 7 is a functional block diagram of the image forming apparatus.

FIG. 6 is a hardware block diagram of an image forming apparatus 1 according to the embodiment. FIG. 7 is a functional block diagram of the image forming apparatus 1. The image forming apparatus 1 is, for example, a printer or a copy machine. The image forming apparatus 1 has the configuration such that another image forming apparatus can work instead thereof. The image forming apparatus 1 includes a data processing unit 2, a data generating unit 3, a data interpreting unit 4, an alternative-data determining unit 5, an input control unit 6, a data-storage managing unit 7, an internal memory (NVRAM) 8, and an external-memory control unit 9.

The data processing unit 2 processes various data by using a central processing unit (CPU) and a computer program. The data generating unit 3 generates various data to be written to each memory of the image forming apparatus 1. The data interpreting unit 4 interprets data. The alternative-data determining unit 5 determines whether data stored in a memory card 10 is valid as alternative data. The input control unit 6 interprets data that is received through an operation panel or the like. The data-storage managing unit 7 reads/writes data from/to the internal memory 8. The internal memory 8 is a nonvolatile memory. The external-memory control unit 9 reads/writes data from/to the memory card 10. The memory card 10 is a nonvolatile memory, and is configured to be connected to the image forming apparatus 1. In the embodiment, an external memory is explained as a memory card; however, it can be, for example, a removable hard disk drive or the like.

Figure 1:
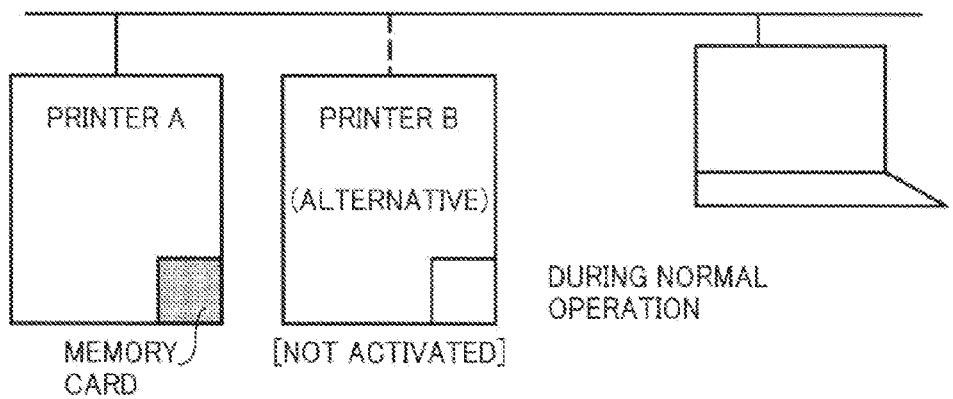
FIGS. 1 to 5 are schematic diagrams for explaining operation when an originally-used image forming apparatus malfunctions according to an embodiment of the present invention.
Figure 2:
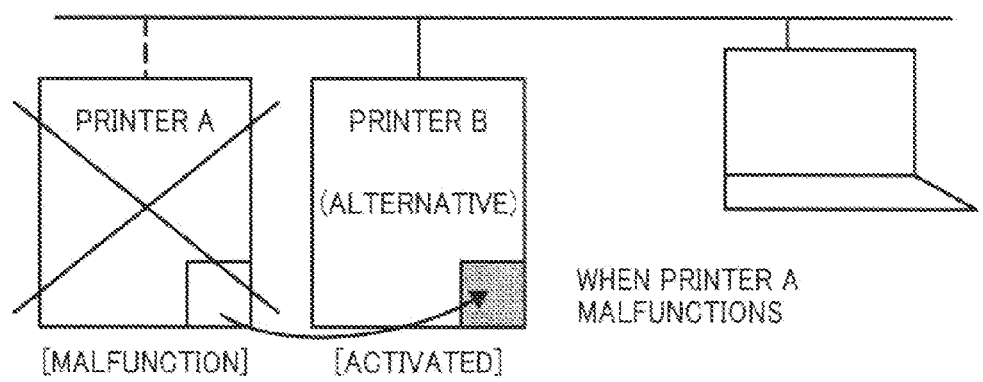
Figure 3:
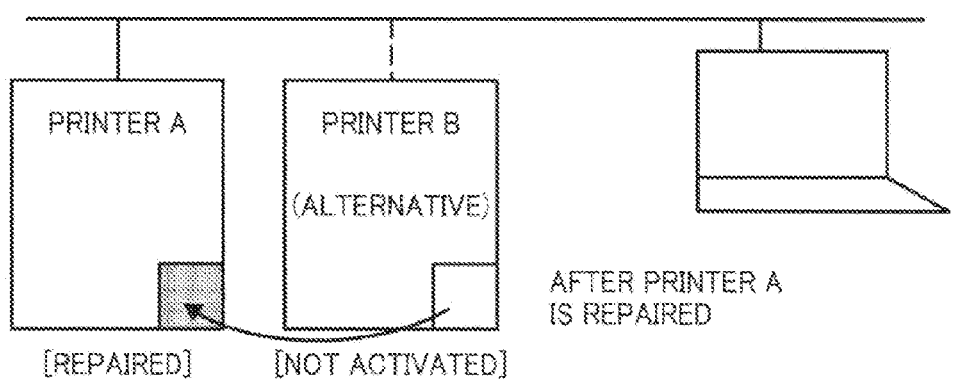

FIGS. 1 to 3 are schematic diagrams for explaining operation of the embodiment when an originally-used image forming apparatus malfunctions. In the following explanation, printers are cited, by way of example, as image forming apparatuses. As shown in FIG. 1, printers A and B are connected to a network. A memory card (external memory) connected to the printer A stores therein setting data about the printer A. The setting data includes data about settings for a tray to be used and for communication. As shown in FIG. 2, when the printer A cannot be used due to some reason such as malfunction, the memory card is removed from the printer A, and is then connected to the printer B that is connected to the same network as the printer A. In this manner, the printer B can be used based on the same setting data as that of the printer A. When the memory card is not connected to the printer B, the printer B cannot be activated by itself. The printer B is activated upon detecting that the memory card is connected thereto. Furthermore, the printer B is activated only when a model type of the printer A that has stored its data in the memory card is the same as that of the printer B.

As described above, the printer B becomes active upon detecting that a memory card is connected thereto, or the printer B determines that a model type of the printer A that has stored its data in the memory card is the same as that of the printer B. Based on the determination result, the printer B becomes active. Specifically, the printer B determines whether data about the printer A stored in the memory card is valid, i.e., the data is stored in the memory card by an image forming apparatus of the same model type as that of the printer B, based on a file name of the data. Alternatively, the printer B determines whether the data stored in the memory card is valid based on a tag embedded in the data.

Furthermore, an operation mode of an image forming apparatus can be switched by an operator, and a mode for activating the image forming apparatus can be changed based on the operation mode. As shown in FIG. 3, after the printer A is repaired, the memory card is removed from the printer B and is connected to the printer A again.

Figure 4:
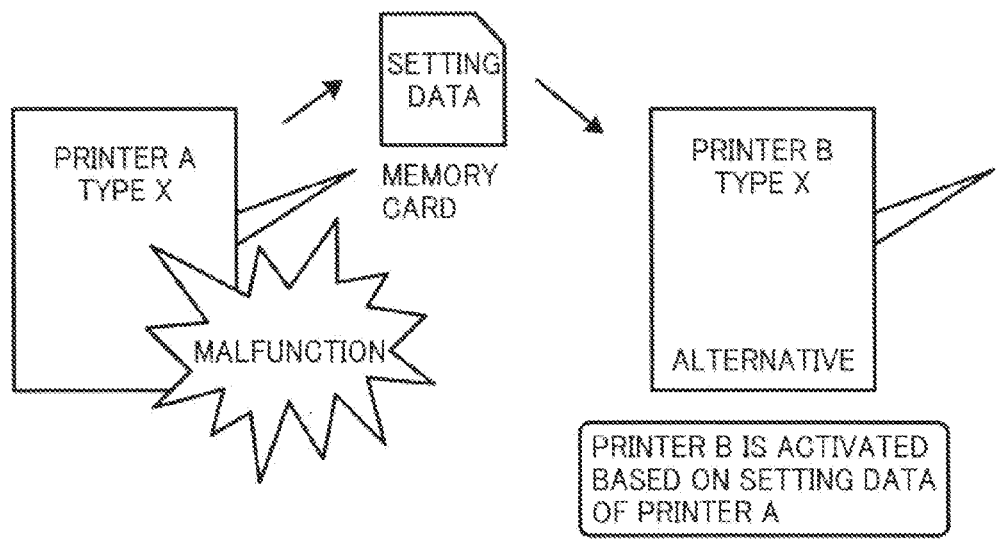
Figure 5:
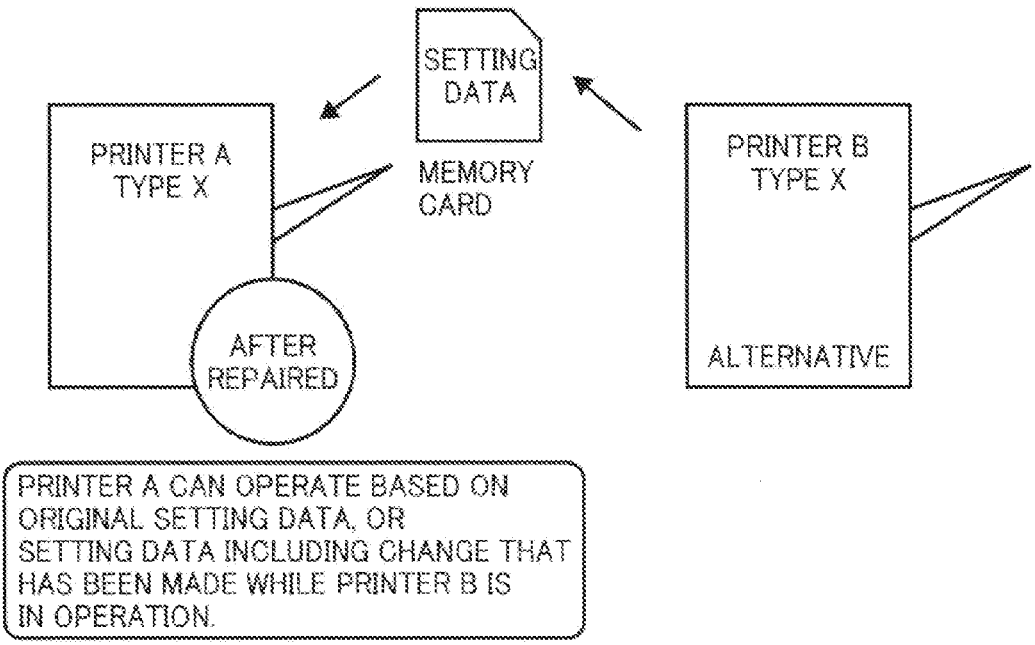

FIGS. 4 and 5 are other schematic diagrams for explaining operation when the originally-used image forming apparatus (printer A) malfunctions. As shown in FIG. 4, when the printer A (model type of the printer A is Type X) malfunctions, a memory card of the printer A is removed from the printer A and is connected to the printer B (model type of the printer B is Type X, i.e., the same as that of the printer A). In this manner, the printer B can be used based on the same setting data as that of the printer A. As shown in FIG. 5, after the printer A is repaired, the memory card is removed from the printer B and is connected to the printer A again. Thus, the printer A can operate based on the original setting data. If the original setting data has changed while the printer B is in use, the printer A can operate based on changed setting data.

As shown in FIG. 6, because the image forming apparatus 1 has basically the same hardware configuration as that of a conventional image forming apparatus, a detailed description thereof is omitted. A random access memory (RAM) is a volatile main memory such as a dynamic random access memory (DRAM). A nonvolatile random access memory (NVRAM) stores therein data about an operation environment and an operation log of the image forming apparatus 1. A read-only memory (ROM) stores therein a control program, such as firmware, and data about basic fonts used for printing. The operation panel is used as a user interface, by which an operator operates the image forming apparatus 1 and checks a status of the image forming apparatus 1. An engine drives the image forming apparatus 1 to form an image. A memory card interface (I/F) is used for inputting/outputting data to/from the memory card.

As shown in FIG. 7, the input control unit 6 interprets data received through the operation panel, and then sends contents of the received data, for example, data on a selected button, to the data interpreting unit 4. The data interpreting unit 4 interprets data received from the input control unit 6 and determines a type of setting for the data. The data interpreting unit 4 also interprets data received from the external-memory control unit 9. The alternative-data determining unit 5 included in the data interpreting unit 4 receives the data that has been interpreted by the data interpreting unit 4, and determines whether the data is generated by another image forming apparatus. The image forming apparatus 1 is characteristically different from a conventional image forming apparatus in that the image forming apparatus 1 includes the alternative-data determining unit 5.

The data generating unit 3 generates data to be written to the memory card 10 or the internal memory 8. The data-storage managing unit 7 writes data received from the data generating unit 3 to the internal memory 8. The data-storage managing unit 7 also acquires desired data from the internal memory 8. The external-memory control unit 9 writes data received from the data generating unit 3 to the memory card 10 (external memory). The external-memory control unit 9 also acquires desired data from the memory card 10. The external-memory control unit 9 transmits/receives data to/from the memory card 10. The external-memory control unit 9 stores data about the image forming apparatus 1 in the memory card 10. The internal memory 8 stores therein various data about the image forming apparatus 1, such as setting data and model data that contains an identification number or a model number of the image forming apparatus 1. The memory card 10 is a secure digital (SD) card or the like that is configured to be connected to the image forming apparatus 1, and data can be written to the memory card 10. The setting data can be restored using the memory card 10.

The model data includes data for identifying a model type of the image forming apparatus 1, such as a model name or a model code. The setting data includes data about settings for communication such as an IP address, general settings such as a setting for an energy-saving mode, and settings for printing operation performed by the image forming apparatus 1, such as settings for a tray or two-sided printing. The data to be written to the internal memory 8 includes specific data for checking validity.

Figure 8:
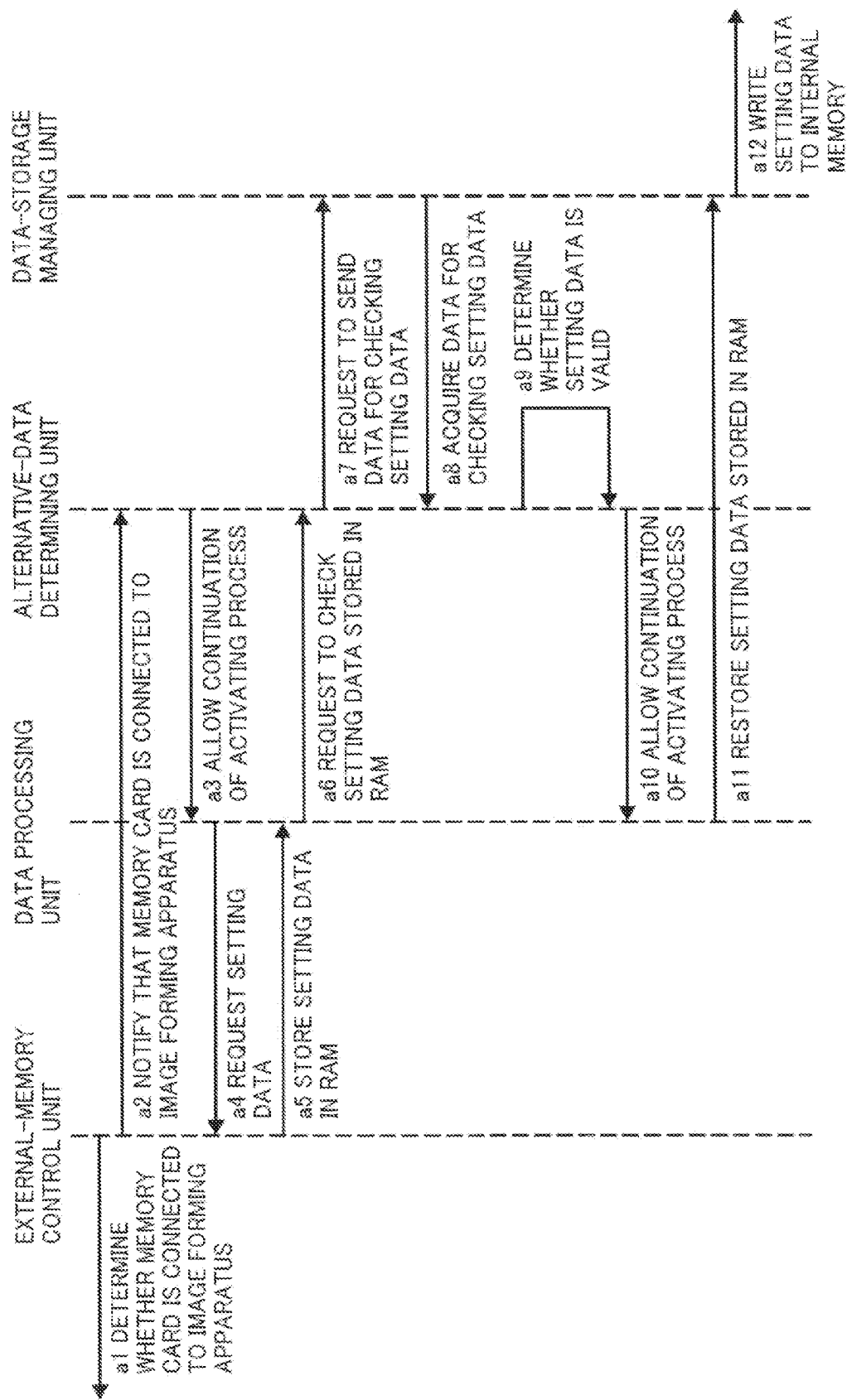
FIGS. 8 to 10 are sequence diagrams for explaining processes performed by the image forming apparatus.

FIG. 8 is a sequence diagram for explaining a process of activating the image forming apparatus 1 based on the determination as to whether setting data is valid. The external-memory control unit 9 determines whether the memory card 10 is connected to the image forming apparatus 1 (step a1). When the memory card 10 is connected to the image forming apparatus 1, the external-memory control unit 9 notifies the alternative-data determining unit 5 via the data processing unit 2 that the memory card 10 is connected to the image forming apparatus 1 (step a2). Upon receiving the notification from the external-memory control unit 9, the alternative-data determining unit 5 allows the data processing unit 2 to continue a process of activating the image forming apparatus 1 (step a3). That is, the alternative-data determining unit 5 does not allow the data processing unit 2 to continue the process of activating the image forming apparatus 1 until the alternative-data determining unit 5 receives the notification. The data processing unit 2 requests the memory card 10 to send data that is assumed to be setting data (step a4). Upon receiving the requested data from the memory card 10, the data processing unit 2 stores the received data in the main memory (RAM) (step a5). When a determining process, i.e., a process of determining whether setting data is valid, is performed based only on detection of whether the memory card 10 is connected to the image forming apparatus 1, the determining process ends at step a5, and proceeds to a subsequent sequence of activating the image forming apparatus 1 as usual.

Specifically, the validity of setting data can be determined based only on detection of whether a memory card is connected to an image forming apparatus by providing image forming apparatuses of each model type with a unique shaped connector for a memory card. With such a connector, an image forming apparatus can determine that another image forming apparatus of the same model type has stored data in a memory card when the memory card is insertable to the connector of the image forming apparatus. Alternatively, image forming apparatuses of the same model type can have the same key for a connector for a memory card, so that the memory card cannot be connected to an image forming apparatus of a different model type. Other methods can be employed for the determining process. In any method, when a memory card can be connected to an image forming apparatus, it is determined that the memory card is valid. It should be noted that image forming apparatuses of the same model has the same function and can be replaced by each other, although the image forming apparatuses have small differences with respect to each other.

When the determining process includes not only detecting whether the memory card 10 is connected to the image forming apparatus 1 but also other processes, the process control proceeds to step a6. The data processing unit 2 requests the alternative-data determining unit 5 to check the data that is assumed to be setting data stored in the RAM (step a6). The alternative-data determining unit 5 requests the data-storage managing unit 7 to send data for checking the setting data (step a7). The alternative-data determining unit 5 thus acquires the data for checking the setting data from the data-storage managing unit 7 (step a8). The alternative-data determining unit 5 compares the data stored in the RAM with the data for checking to determine whether the data in the RAM is valid as the setting data (step a9). When the data in the RAM is valid, the alternative-data determining unit 5 allows the data processing unit 2 to continue the process of activating the image forming apparatus 1 (step a10). That is, it is not possible to continue the process of activating the image forming apparatus 1 until the alternative-data determining unit 5 determines that the data is valid as setting data.

A subsequent sequence of activating the image forming apparatus 1 is performed as usual as described below. The data processing unit 2 restores the setting data that has been stored in the RAM, and sends it to the data-storage managing unit 7 (step a11). The data-storage managing unit 7 writes the restored setting data to the internal memory 8 if required (step a12). The process at step a12 is not necessarily performed. When the setting data is not written to the internal memory 8, the image forming apparatus 1 can operate based on the setting data stored in the RAM. Because it takes longer time to access the internal memory 8 than the RAM, the image forming apparatus 1 operates by referring to the setting data stored in the RAM, rather than referring directly to the setting data stored in the internal memory 8.

Figure 9:
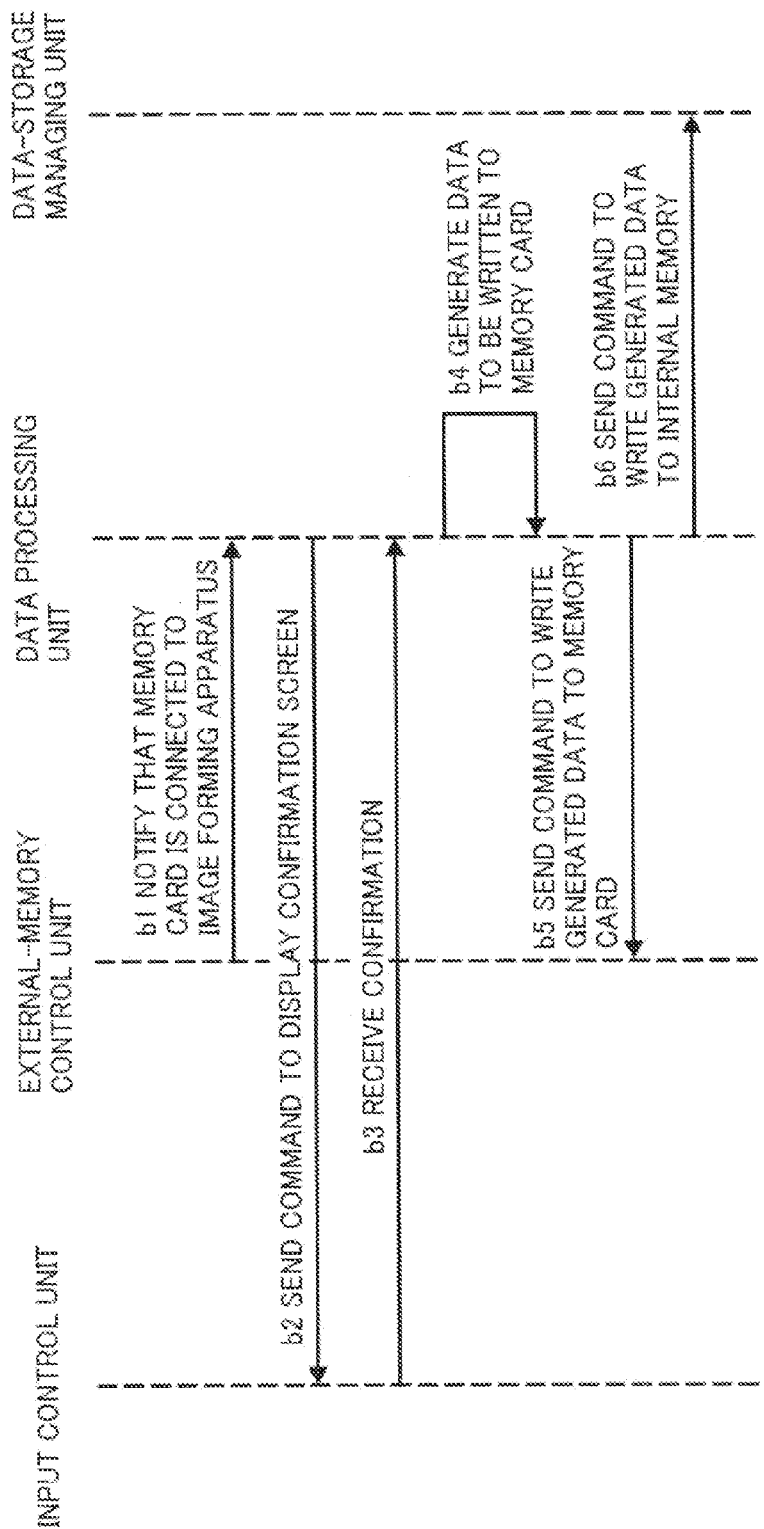

FIG. 9 is a sequence diagram for explaining a basic process of storing setting data in the memory card 10 when the memory card 10 is connected to the image forming apparatus 1. The external-memory control unit 9 notifies the data processing unit 2 that the memory card 10 is connected to the image forming apparatus 1 (step b1). The data processing unit 2 sends a command to the input control unit 6 to display a confirmation screen on the operation panel or the like to confirm acceptance by an operator as to whether data can be written to the memory card 10 (step b2). When an operation button is pushed by an operator to confirm that data can be written to the memory card 10 (step b3), the process control proceeds to step b4. The processes at steps b2 and b3 can be omitted. The data processing unit 2 generates data to be written to the memory card 10 (step b4). The data processing unit 2 sends a command to the external-memory control unit 9 to write the data generated by the data processing unit 2 to the memory card 10 (step b5). The data processing unit 2 sends a command to the data-storage managing unit 7 to write the data to the internal memory 8 (step b6).

Figure 10:
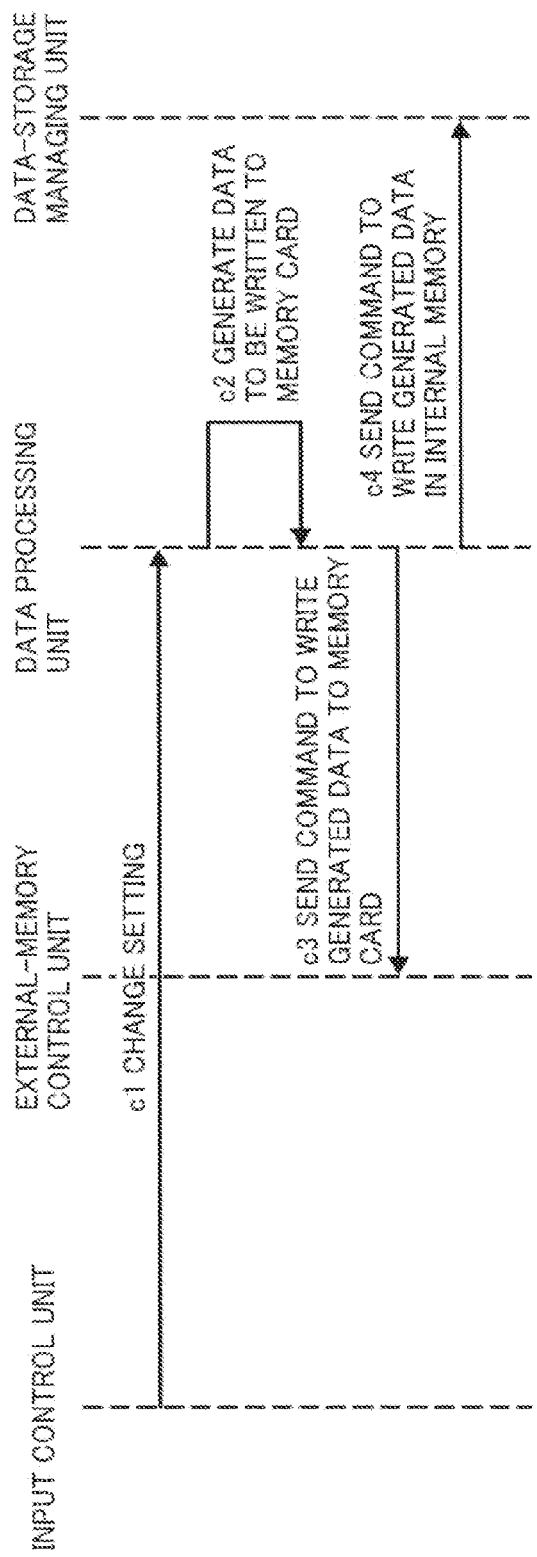

FIG. 10 is a sequence diagram for explaining a process of storing setting data about the image forming apparatus 1 in the memory card 10 when the setting data has been altered or changed. The input control unit 6 notifies the data processing unit 2 that data is received through the operation panel (step c1). The data processing unit 2 then generates data to be written to the memory card 10 (step c2). The data processing unit 2 sends a command to the external-memory control unit 9 to write the data generated by the data processing unit 2 to the memory card 10 (step c3). The data processing unit 2 sends a command to the data-storage managing unit 7 to write the data to the internal memory 8 (step c4).

Figure 11:
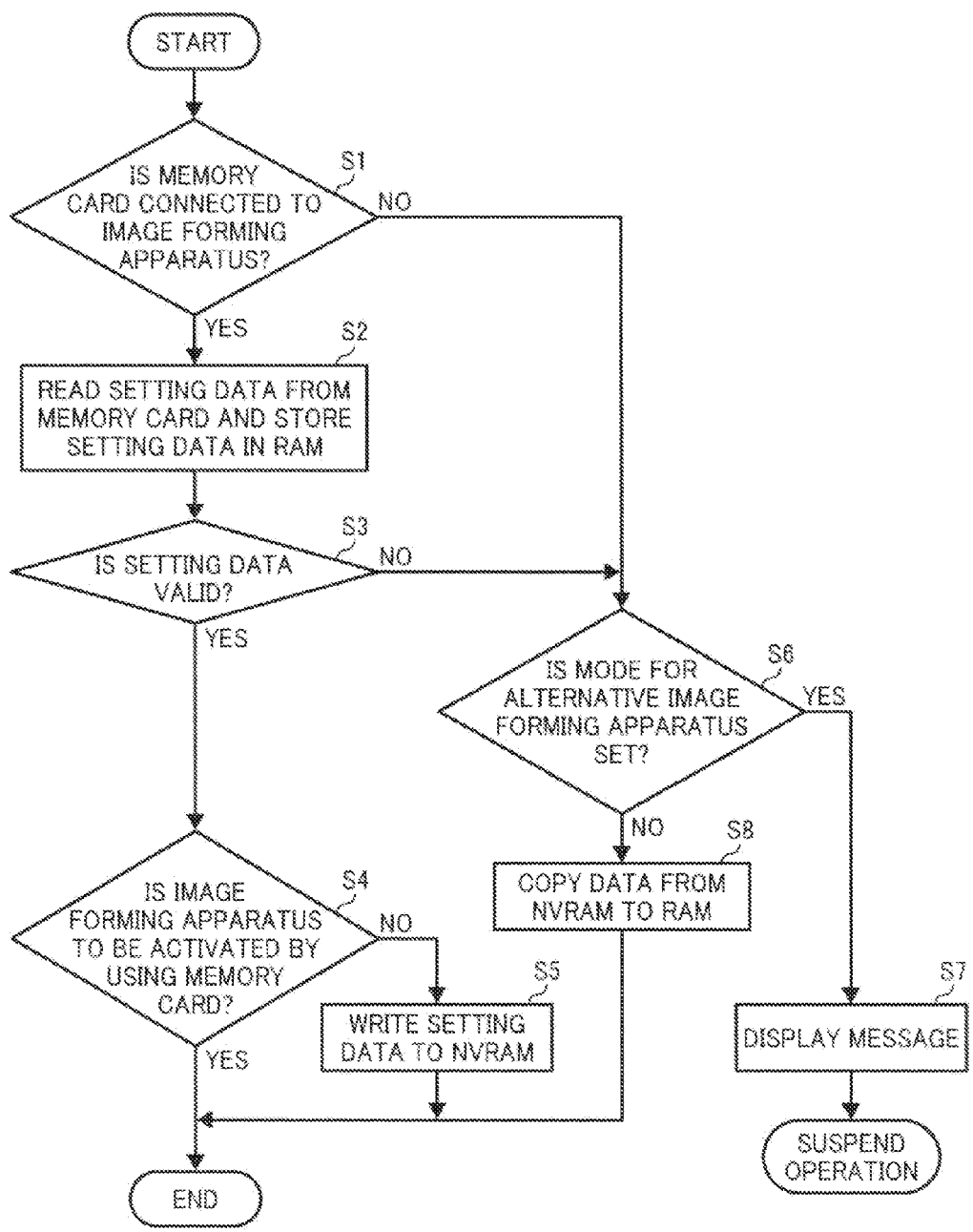
FIG. 11 is a flowchart for explaining a process of restoring setting data by the image forming apparatus.
Figure 12:
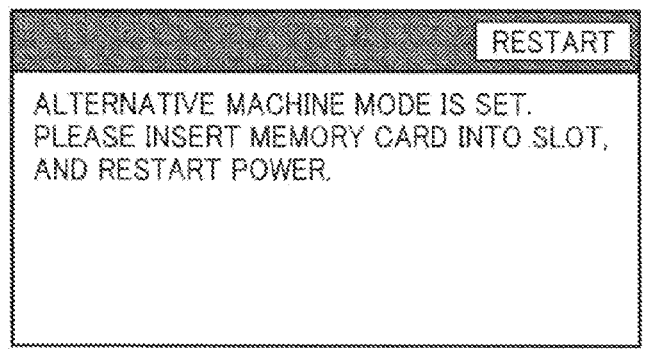
FIG. 12 is a schematic diagram of a message displayed when a mode for an alternative image forming apparatus is set as shown in FIG. 11.

FIG. 11 is a flowchart of a process of restoring setting data performed by the image forming apparatus 1. FIG. 12 is an example of a message displayed when a mode for an alternative image forming apparatus is set. It is checked whether the memory card 10 is connected to the image forming apparatus 1 (step S1). When the memory card 10 is connected to the image forming apparatus 1, data is read from the memory card 10 and is stored in the RAM (step S2). It is checked whether the data stored in the RAM is valid as setting data (step S3). When the data is valid, it is checked whether the image forming apparatus 1 is to be activated using the memory card 10 (step S4). When the image forming apparatus 1 is to be activated using the memory card 10, the process ends. When the image forming apparatus 1 is not to be activated using the memory card 10, the setting data is written to the internal memory 8 (step S5), and then the process ends. When the memory card 10 is not connected to the image forming apparatus 1 (No at step S1) or the data is not valid (No at step S3), it is checked whether a mode for an alternative image forming apparatus is set (step S6). When the mode for an alternative image forming apparatus is set, a message as shown in FIG. 12 is displayed (step S7), and the activation of the image forming apparatus 1 is suspended. The message says "alternative machine mode is set. Please insert memory card into slot, and restart power". When the mode for an alternative image forming apparatus is not set, the setting data is copied from the internal memory 8 to the main memory (step S8), and then the process ends.

The following two methods can be used to determine whether the setting data in the memory card 10 is valid. In a first method, a rule is defined to generate a file name in a file system that is used for the memory card 10. To determine whether setting data of the memory card 10 is valid, it is checked whether a file name of the setting data is generated based on the rule. Preferably, a file name is generated based on the rule in such a manner that the file name indicates a model type of an image forming apparatus by which setting data is stored. For example, when a model name of a printer is "Xprinter", a file name of the setting data is defined as "XprinterSetting.dat". In a second method, when setting data is written to the memory card 10, specific data (tag) is stored as a header in the setting data, and it is determined whether the setting data is valid by checking matching of the tag. Contents of the tag include a model name, or a model code that is a byte string and is used for internally managing an image forming apparatus.

The mode for an alternative image forming apparatus is used for determining whether operation of the alternative-data determining unit 5 is made effective. The following three methods can be used to set the mode for an alternative image forming apparatus. In a first method, the mode is set in a normal operation menu through the operation panel. In a second method, the mode for an alternative image forming apparatus is set by special operation. Because the mode is often set by the limited number of people including an administrator of the image forming apparatus, the mode is set by a special mode, such as a SP mode which requires a login with a password. In a third method, the mode for an alternative image forming apparatus is set by using hardware, such as a DIP switch or a jumper.

When the process control proceeds to END, the image forming apparatus 1 is activated by using the setting data stored in the RAM. Because it takes more time to access the memory card 10 and the internal memory 8 than the RAM, the setting data stored in the RAM is used for activating the image forming apparatus 1.

Figure 13:
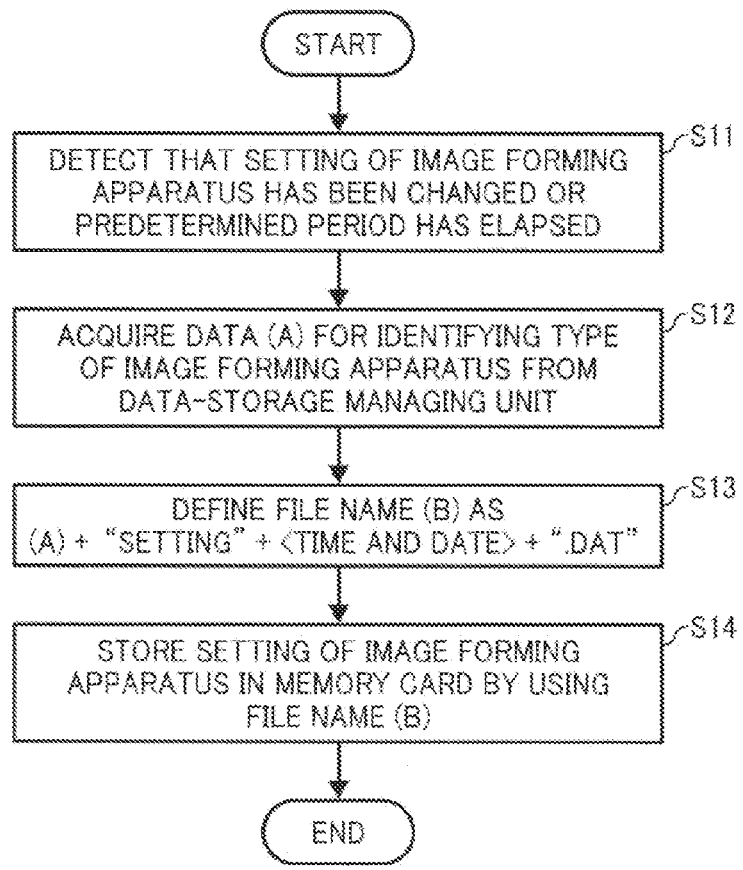
FIG. 13 is a flowchart for explaining a process of restoring setting data by using a file name by the image forming apparatus.

FIG. 13 is a flowchart for explaining a process of restoring setting data by using a file name. When it is detected that a change has been made in setting data about the image forming apparatus 1 or a predetermined period has elapsed (step S11), data (A) for identifying a type of the image forming apparatus 1 is acquired from the data-storage managing unit 7 (step S12). A file name (B) is defined as (A)+"SETTING"+<time and date>+".DAT" (step S13). The setting data is then stored in the memory card 10 by using the file name (B) (step S14).

Figure 14:
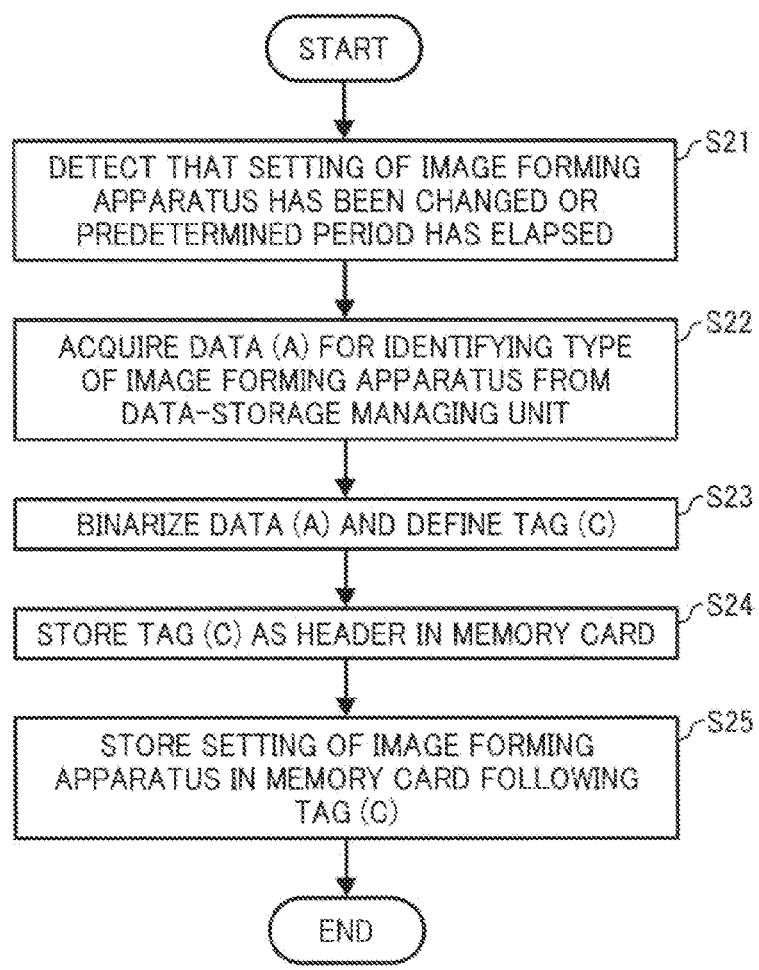
FIG. 14 is a flowchart for explaining a process of restoring setting data by using a tag by the image forming apparatus.

FIG. 14 is a flowchart of a process of restoring setting data by using a tag. When it is detected that a change has been made in setting data about the image forming apparatus 1 or a predetermined period has elapsed (step S21), data (A) for identifying a type of the image forming apparatus 1 is acquired from the data-storage managing unit 7 (step S22). The data (A) is binarized and a tag (C) is defined (step S23). The tag (C) is stored as a header in the memory card 10 (step S24). The setting data is then stored in the memory card 10 following the tag (C) (step S25).

As described above, an image forming apparatus is activated when a memory card is connected to the image forming apparatus and a model type of an image forming apparatus that has stored data in the memory card is the same as that of the image forming apparatus. In this manner, it is possible to operate an image forming apparatus and an alternative thereof appropriately.

According to an aspect of the present invention, an originally-used image forming apparatus and an alternative image forming apparatus can operate without confusion. It is possible to prevent a situation where the originally-used image forming apparatus and the alternative image forming apparatus cannot operate properly when both of them are connected to the same network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
an internal memory that stores therein data about the image forming apparatus including internal model data and setting data;
an external-memory control unit that receives and transmits apparatus data from and to an external memory;
an apparatus-data determining unit that determines whether the apparatus data received by the external-memory control unit from the external memory is data that has been stored in the external memory by another apparatus having a same model type as that of the image forming apparatus;
an activation determining unit that determines whether to activate the image forming apparatus on the basis of the apparatus data received from the external memory when the apparatus-data determining unit determines that the apparatus data is the data that has been stored in the external memory by the another apparatus having the same model type;
a memory control unit that stores the apparatus data in the internal memory when the activation determining unit determines not to activate the image forming apparatus on the basis of the apparatus data received by the external memory; and an activating unit that activates the image forming apparatus on the basis of the activation determining unit determining to activate the image forming apparatus, wherein the external memory is a removable non-volatile memory card which is configured to be connected to either the image forming apparatus or the another apparatus, and the external-memory control unit receives the apparatus data from the external memory when the external memory is connected to the image forming apparatus.

2. The image forming apparatus according to claim 1, wherein:

the activating unit includes a detecting unit that detects whether the external memory is connected to the image forming apparatus, and the activating unit activates the image forming apparatus when the detecting unit detects that the external memory is connected to the image forming apparatus.

3. The image forming apparatus according to claim 1, wherein the apparatus-data determining unit determines validity of the apparatus data based on a file name of the apparatus data received from the external memory.

4. The image forming apparatus according to claim 1, wherein the apparatus-data determining unit determines validity of the apparatus data based on a tag embedded in the apparatus data received from the external memory.

5. The image forming apparatus according to claim 1, further comprising a switching unit that switches an operation mode of the image forming apparatus, wherein the activating unit changes a mode for activating the image forming apparatus depending on the operation mode and activates the image forming apparatus based on the mode.

6. A method of activating an image forming apparatus comprising:

reading apparatus data including model data and setting data from an external memory;

determining whether the apparatus data read from the external memory at the reading is data that has been stored in the external memory by an apparatus having a same model type as that of the image forming apparatus;

determining whether to activate the image forming apparatus on the basis of the apparatus data received from the external memory when it is determined that the apparatus data is the data that has been stored in the external memory by the apparatus having the same model type;

storing the apparatus data in the internal memory when the determining whether to activate the image forming apparatus results in a determination not to activate the image forming apparatus on the basis of the apparatus data received by the external memory; and activating the image forming apparatus on the basis of the determining whether to activate the image forming apparatus resulting in a determination to activate the image forming apparatus, wherein the external memory is a removable non-volatile memory card which is configured to be connected to either the image forming apparatus or the another apparatus, and the apparatus data is received by the image forming apparatus, from the external memory, when the external memory is connected to the image forming apparatus.

7. The method according to claim 6, wherein the activating includes determining a type of the apparatus data stored in the external memory and controlling activation of the image forming apparatus based on the type of the apparatus data read at the reading.

8. The method according to claim 7, wherein the activating includes controlling activation of the image forming apparatus based on a file name of the apparatus data read at the reading.

9. The method according to claim 7, wherein the activating includes controlling activation of the image forming apparatus based on tag data embedded in the apparatus data read at the reading.

* * * * *